Aug. 16, 1955   W. A. BEDFORD, JR   2,715,250
FASTENING DEVICE
Filed Aug. 1, 1951

INVENTOR:
WILLIAM A. BEDFORD JR.,
By Robert E Ross
AGENT.

United States Patent Office 2,715,250
Patented Aug. 16, 1955

2,715,250

FASTENING DEVICE

William A. Bedford, Jr., North Scituate, Mass., assignor, by mesne assignments, to United-Carr Fastener Corporation, Boston, Mass., a corporation of Delaware Application August 1, 1951, Serial No. 239,815

1 Claim. (Cl. 20—69)

This invention relates generally to fastening devices, and has particular reference to a one-piece sheet metal fastener for use in attaching a flexible strip along the edge of a support.

In the construction of automobiles and the like, it is necessary to provide resilient sealing means about the doors to prevent passage of air, dust, and moisture between the door and the frame. Such sealing means, commonly known as wind cord or weather strip, must be securely fastened about the edge of the metal portions of the structure. Various fastening devices have been used for this purpose, but they all have had a number of disadvantages, such as being too expensive, not having sufficient holding power, and being too difficult to install in assembly line operations.

The object of the invention is to provide a one-piece sheet metal fastener for attaching a weather strip or the like to a panel edge which is inexpensive and adapted to rapid assembly without the use of special tools.

A further object of the invention is to provide a weather strip having a pair of legs for straddling an edge of the strip and snap fastener means for engaging the support in such a manner that the legs are retained in engagement with the strip on opposite sides thereof. A still further object of the invention is to provide a weather strip fastener having a pair of substantially flat spaced arms for engagement on opposite sides of the strip and a body portion having snap fastener means disposed thereon for engagement into a support opening to retain the legs flatwise against opposite sides of the strip.

Other objects of the invention will, in part, be obvious, and will, in part, appear hereinafter.

Figure 1:
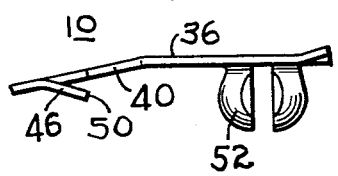
Fig. 1 is a view in side elevation of a fastening device embodying the features of the invention.
Figure 2:
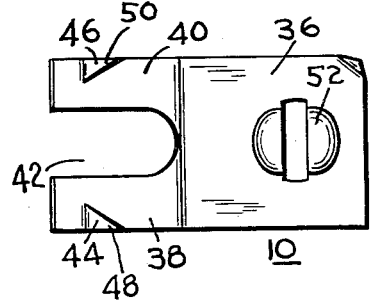
Fig. 2 is a top plan view of the fastener of Fig. 1.
Figure 3:
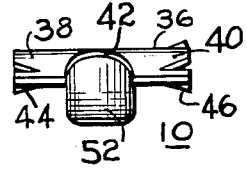
Fig. 3 is a view of the fastener of Fig. 1 as seen from the left end.

Referring to the drawing, there is illustrated a fastening device 10 which is adapted to attach a wind cord or weather strip 12 to a support 14.

The support 14, which may be a portion of an automobile door or the like, may be provided with a channel portion 16 formed along the edge thereof with an outer edge member 18 disposed substantially normal to the plane of the support. The support usually has a flat portion 20 adjacent the channel with fastener-receiving openings 22 provided therein. The weather strip 12 is ordinarily formed of sponge rubber or the like covered with cloth, and comprises a substantially cylindrical sealing portion 24 having a web portion 26 extending therefrom. In some installations an inner sealing member 28 may be provided, which is formed of plastic or rubber, and has an attaching flange 30 secured to the web 26 and a sealing flange 32 extending therefrom to be positioned on the inner side of the outer edge member 18. The web 26 and the flange 30 together form an attaching portion 34 for engagement with the fastener in a manner to be described hereinafter.

The fastener 10, which is preferably formed of a single piece of stiff but resilient sheet metal, comprises generally a flat body portion 36 having a pair of legs 38 and 40 extending from one end thereof. The legs are disposed generally in the same plane and extensions of the base, and are spaced laterally so as to provide a weatherstrip-receiving slot 42 therebetween.

The legs 38 and 40 are provided with tongue members 44 and 46 which are formed in the outer edges thereof, and are inclined outwardly from the plane of the legs toward the body portion 36 terminating in pointed ends 48 and 50. The tongues 44 and 46 protrude from the same side of the legs 38 and 40 for a purpose to be hereinafter described.

To provide means for engagement with the support 14, a resilient snap fastener stud 52 is provided on the flat body portion 36 which protrudes outwardly from the plane thereof and is preferably formed from the metal of the body portion.

Figure 4:
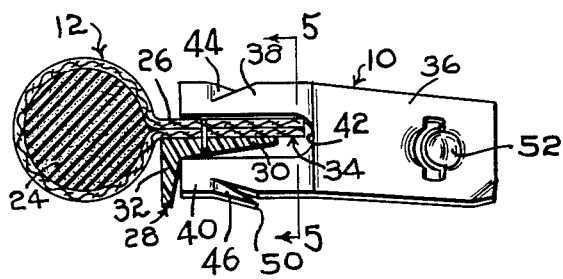
Fig. 4 is a view in transverse section of a weather strip, illustrating the first step in the assembly of the fastener of Fig. 1.
Figure 5:
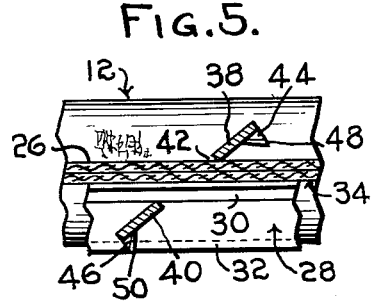
Fig. 5 is a view in section taken on line 5—5 of Fig. 4.
Figure 6:
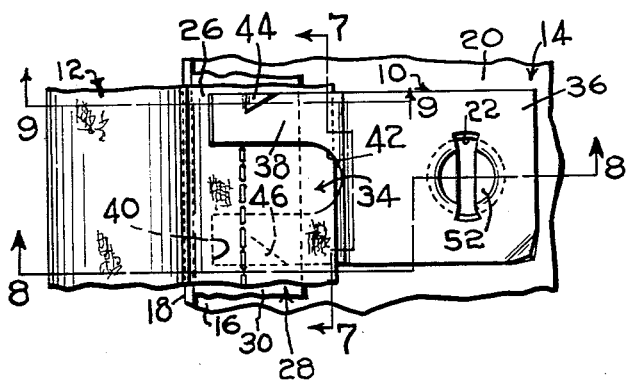
Fig. 6 is a top plan view of the weather strip attached to a support by means of the fastener of Fig. 1.
Figure 7:
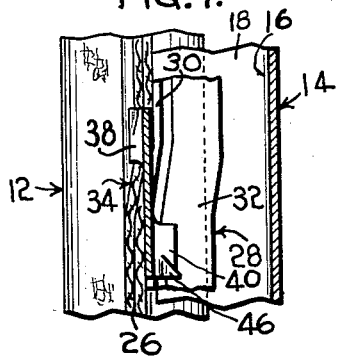
Fig. 7 is a view in section taken on line 7—7 of Fig. 6.
Figure 8:
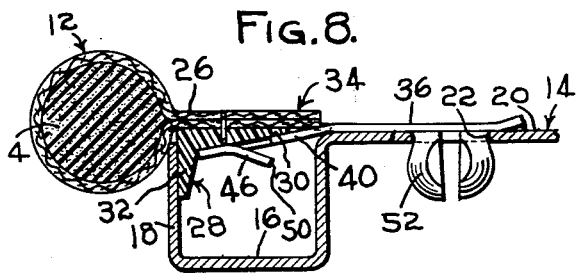
Fig. 8 is a view in section taken on line 8—8 of Fig. 6.
Figure 9:
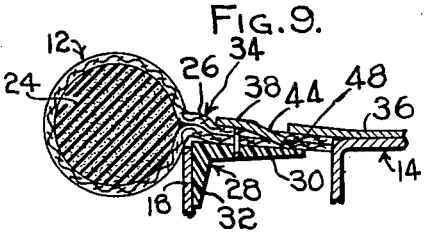
Fig. 9 is a view in section taken on line 9—9 of Fig. 6.

To assemble the weather strip 12 onto the support by means of the fastener 10, the legs 38 and 40 of the fastener are placed astraddle the attaching portion 34 so that said attaching portion enters the slot 42 with the legs disposed on opposite sides thereof. (See Figs. 4 and 5.) The fastener 10 may then be rotated so that the flat sides of the legs bear against the outer opposite sides of the attaching portion 34. Due to the thickness of the attaching portion, the legs will bear against said opposite sides before the fastener is rotated far enough that the plane of the flat body portion 36 is parallel to the strip. Thereafter, further rotation will cause both flexing of the legs 38 and 40 and slight bending of the engaged portion of the strip, and in the illustrated assembly, the tongue 44 in the leg 38 digs into engagement with one side of the attaching portion 34. The snap fastener 52 protruding from the flat body portion may then be snapped into engagement in a support opening 22, so that the flat body portion is held securely flatwise against the flat portion 20 of the support to retain the legs in secure flatwise engagement against opposite sides of the attaching portion 34 (see Figs. 6 to 9), and to retain the weatherstrip in the proper position in the frame.

Since the tongues 44 and 46 both protrude from the same side of the legs, only one tongue will engage the attaching portions. However, such construction allows the fastener to be rotated in either direction after the legs are straddled over the strip, so that the snap fastener 50 may be disposed in the desired direction in relation to the strip, with one of the tongues 44 or 46 being in position to engage the attaching portions in either case.

In some cases the legs need not be flat, but may have other desired shapes. If the attaching portion of the strip is extremely thick, the legs may be disposed in different planes to prevent excessive flexing thereof when the fastener is assembled.

The illustrated fastener is adapted for rapid assembly, since no special tools are required, and is adapted for economical production on automatic machines from a continuous strip of sheet metal.

Since certain obvious modifications may be made in the device without departing form the scope of the invention, it is intended that all matter contained herein be interpreted in an illustrative and not in a limiting sense.

I claim:

A fastener assembly, comprising a support having an opening adjacent an edge thereof, a weather strip member disposed along the edge of the support, said weather strip member comprising a longitudinal sealing portion and a collateral web portion for attachment to the support, and a fastening device attaching the web portion to the support, said fastening device comprising a flat body portion and a pair of laterally spaced legs extending from one end of the body, said legs being initially in substantially the same plane and being flexed into position on opposite sides of the web, means on at least one of said legs engaging the web, and a snap fastener stud drawn from the metal of the base, said stud being disposed in snapping engagement in the opening in the support and maintaining the base flatwise against the support and maintaining the legs bearing against opposite sides of the web.

References Cited in the file of this patent

UNITED STATES PATENTS

| | | |
|---|---|---|
| 1,917,852 | Prez | July 11, 1933 |
| 2,120,143 | Divel | June 7, 1938 |
| 2,180,920 | Churchill | Nov. 21, 1939 |